United States Patent [19]

Moon

[11] Patent Number: 5,624,165
[45] Date of Patent: Apr. 29, 1997

[54] APPARATUS FOR CONTROLLING BRAKE PRESSURE APPLIED TO THE WHEELS OF AUTOMOBILES USING PRESSURE FLUID

[75] Inventor: Sung Dai Moon, Kumee-si, Rep. of Korea

[73] Assignee: Daewoo Electronics Co., Ltd., Seoul, Rep. of Korea

[21] Appl. No.: 548,420

[22] Filed: Oct. 26, 1995

[30] Foreign Application Priority Data

Oct. 26, 1994 [KR] Rep. of Korea .................... 94-27510

[51] Int. Cl.$^6$ ................................................ B60T 13/68
[52] U.S. Cl. ................................. 303/119.2; 137/625.22; 251/129.11
[58] Field of Search ................. 303/113.1, 116.1, 303/119.1, 119.2; 251/129.11, 129.12; 137/625.22, 625.65

[56] References Cited

U.S. PATENT DOCUMENTS

| 1,216,068 | 2/1917 | Caldwell | 137/625.22 |
| 1,934,124 | 11/1933 | Hubbard | 137/625.22 |
| 2,312,941 | 3/1943 | Tucker | 137/625.22 |
| 4,154,425 | 5/1979 | Smith | 251/129.11 |
| 4,768,843 | 9/1988 | Baughtian et al. | 303/119.2 |
| 4,926,983 | 5/1990 | Taubitz et al. | 251/129.11 |

FOREIGN PATENT DOCUMENTS

| 113874 | 9/1981 | Japan | 251/129.11 |
| 263784 | 12/1985 | Japan | 251/129.11 |
| 21076 | 1/1990 | Japan | 251/129.11 |

Primary Examiner—Matthew C. Graham
Attorney, Agent, or Firm—Fish & Richardson P.C

[57] ABSTRACT

A brake pressure control apparatus for ABS in vehicles having a simple construction with a compact size is disclosed. The apparatus has a housing connected to a hydraulic pump to guide the pressure fluid to the apparatus, a step motor mounted on the upper surface of the housing to generate a rotational force, a bushing for guiding the pressure fluid flowed through the housing into the apparatus and a rotary valve rotatably accommodated in the bushing to transfer the pressure fluid which has flowed through the bushing to a wheel cylinder or a fluid tank. The apparatus can be manufactured with reduced cost, and can be easily applied to the ABS.

14 Claims, 3 Drawing Sheets

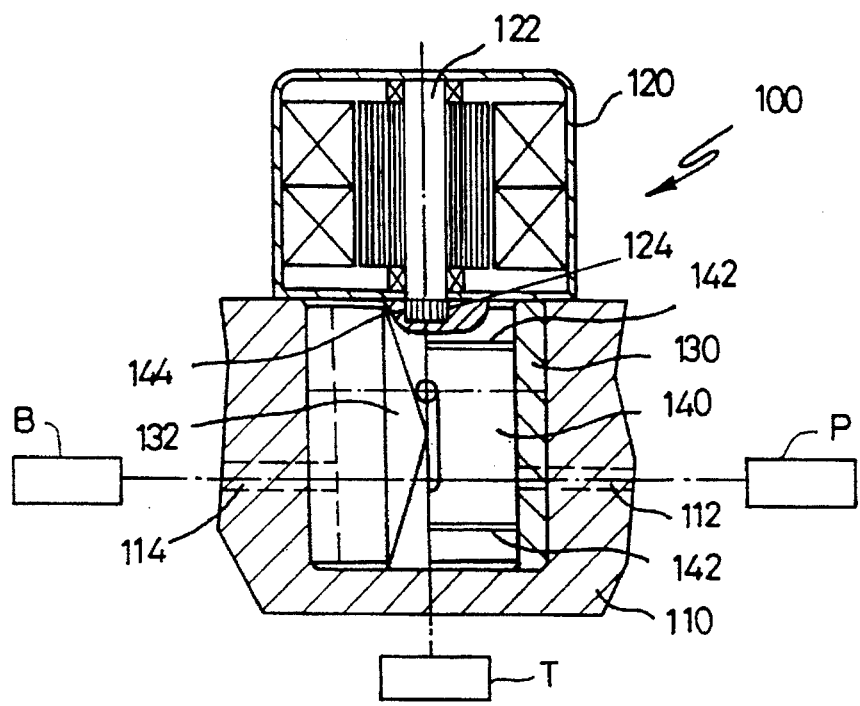
FIG. 1
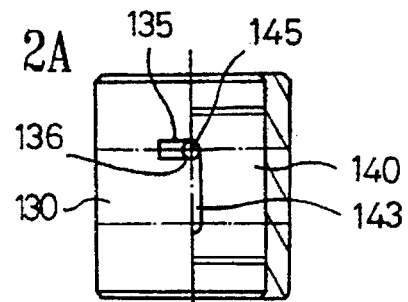
FIG. 2A
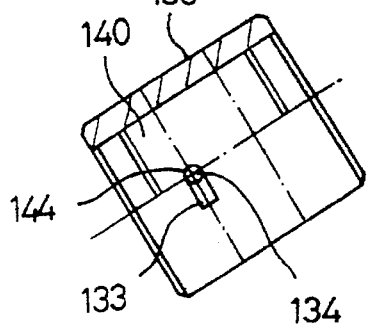
FIG. 2C
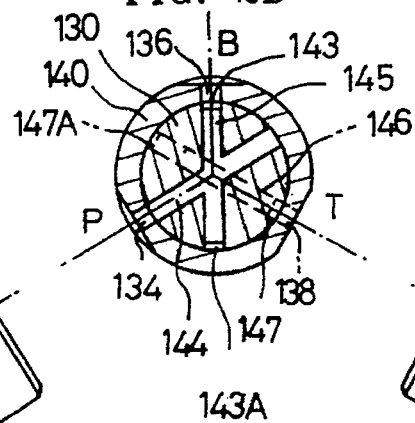
FIG. 2D
FIG. 2B

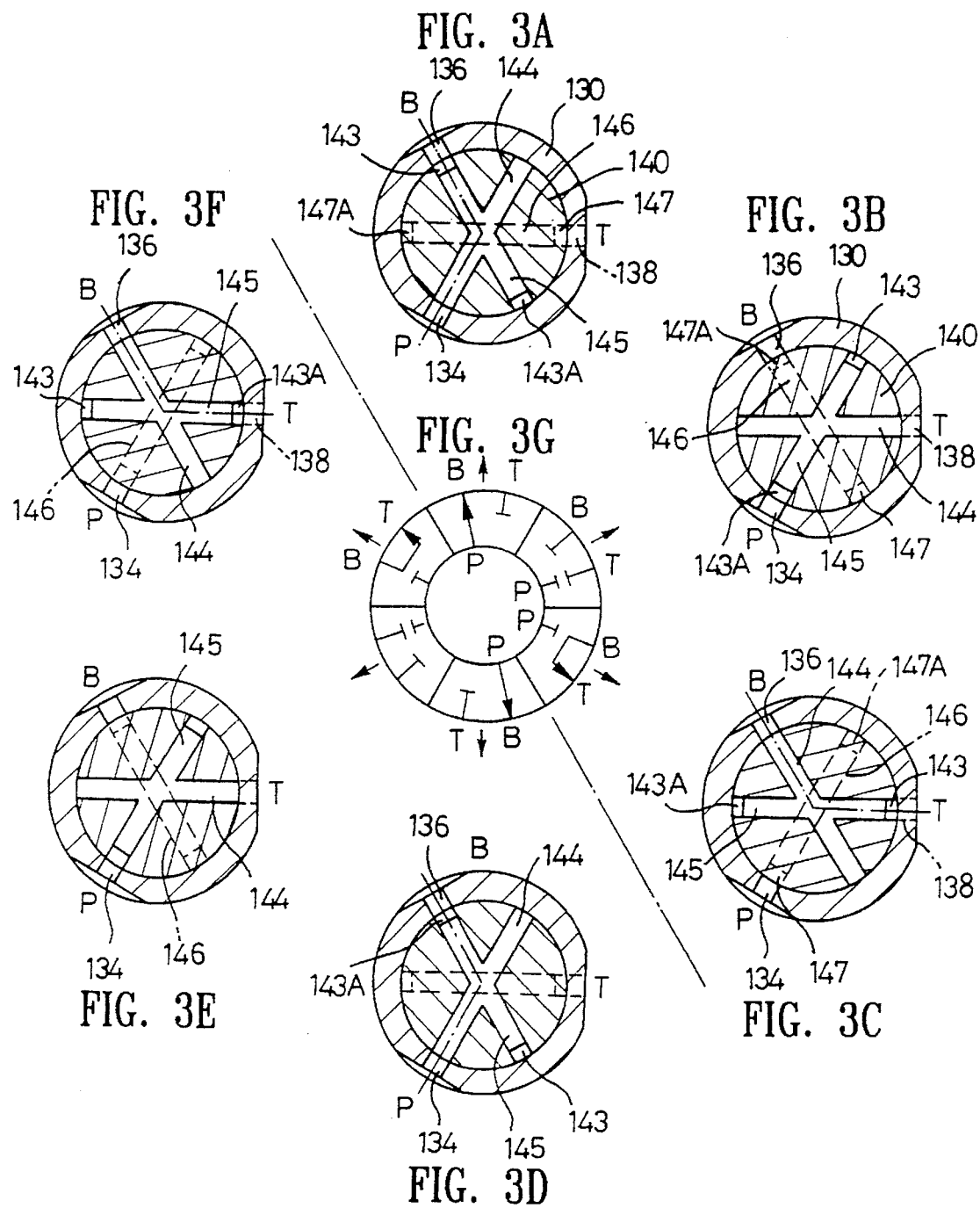

5,624,165

APPARATUS FOR CONTROLLING BRAKE PRESSURE APPLIED TO THE WHEELS OF AUTOMOBILES USING PRESSURE FLUID

BACKGROUND OF THE INVENTION

1. Field of the Invention

The present invention relates to a brake pressure control apparatus for automobiles with an anti-lock braking system, and more particularly to a brake pressure control apparatus for automobiles with an anti-lock braking system which is easily operated and has a simple construction.

2. Prior Arts

Generally, an anti-lock braking system (ABS) is used for preventing the wheels of the automobile from "locking" in the event of a sudden stop of the automobile. The term "locking of the wheels" means that the rolling wheels of the automobile are stopped by the brake pressure applied to the wheels when a driver puts on the brake suddenly during driving the automobile. When the wheels are subjected to this type of locking condition, the wheels slip toward the running direction due to the inertia force of the vehicle so that the frictional force between the wheels and the road surface may be reduced. For this reason, the braking distance may become longer and steering the vehicle may be impossible, thereby causing fatal accidents.

In order to prevent these types of accidents, an anti-lock braking system is provided to the vehicle. The anti-lock braking system increases, maintains, and reduces the brake pressure applied to the wheels rapidly and repeatedly so that the locking of the wheels may be prevented, thereby preventing the fatal accidents.

Generally, the ABS comprises a valve system operated by a pressure source, such as a hydraulic pump according to an electrical signal so as to increase, maintain and reduce the brake pressure to the wheels, a sensor for sensing the RPM of the wheels and a control unit for operating the ABS according to a predetermined algorithm.

In the ABS mentioned above, the first step wherein the brake pressure to the wheels increases is called as a pressure increasing mode, the second step wherein the brake pressure to the wheels maintains constant is called as a pressure maintaining mode and the third step wherein the brake pressure to the wheels reduces is called as a pressure reducing mode.

In the conventional ABS, the pressure increasing mode, the pressure maintaining mode and the pressure reducing mode are performed by operating a solenoid valve.

One of conventional solenoid valves used in the ABS is shown in FIGS. 4A–4C. FIGS. 4A–4C show the pressure increasing mode, the pressure maintaining mode and the pressure reducing mode of the solenoid valve, respectively.

As shown in FIGS. 4A–4C, a solenoid valve 500 includes a cylindrical valve body 510 and a cover 520 attached to a lower end of cylindrical valve body 510 for preventing the leakage of pressure therefrom. Cylindrical valve body 510 has a first port 512 connected to a wheel cylinder (not shown), a second port 560 through which the pressure fluid circulates to a pump (not shown), a first chamber 516 formed above second port 560 and a second chamber 518 formed below second port 560.

An upper valve seat 550 having a pressure fluid inlet 552 is provided at the upper end of first chamber 516 and a lower valve seat 560 having a pressure fluid outlet 564 is provided at the lower end of first chamber 516. A cylinder 558 is disposed between upper valve seat 550 and lower valve seat 560. First and second balls 554 and 562 which are respectively in contact with upper and lower valve seats 550 and 560, are provided at the upper and lower ends of cylinder 558, respectively. First and second springs 556 and 566 are accommodated in cylinder 558 in such a manner that first and second springs 556 and 566 can elastically support first and second balls 554 and 562, respectively. Between first and second springs 556 and 566, a head portion 534 of a movable plunger 532 is disposed so that head portion 534 of plunger 532 pushes first spring 556 when plunger 532 moves upwards. Thus, pressure fluid inlet 552 of upper valve seat 550 is closed by first ball 554.

Second chamber 518 of valve body 510 includes an armature 530 securely coupled to one end of plunger 532, a bush 542 inserted in the upper end portion of second chamber 518 so as to guide the movement of plunger 532 and a solenoid 540 which applies the magnetic force to armature 530 so as to move armature 530 upwards. Between armature 530 and the underside of lower valve seat 560, a third spring 576 for elastically supporting armature 530 is disposed.

The conventional solenoid valve having the above structure is operated as follows.

When a driver puts on the brake suddenly, the speed of the vehicle suddenly decreases. At this time, a speed sensor (not shown) attached to the wheels of the vehicle senses the decreased speed and then sends an operating signal to an electrical control unit (ECU, not shown). Then, the ECU operates the ABS according to a predetermined algorithm. That is, the brake pressure applied to the wheels of the vehicle continuously increases (the pressure increasing mode), maintains constant (the pressure maintaining mode) and reduces (the pressure reducing mode) in accordance with the predetermined algorithm of the ECU.

In the pressure increasing mode, as shown in FIG. 4A, the ECU operates a hydraulic pump (not shown) so that the pressure fluid flows into pressure fluid inlet 552 from the hydraulic pump while pushing first ball 554 downwards. Then, the pressure fluid that has flowed into pressure fluid inlet 552 is applied to the wheel cylinder connected to the wheels through first port 512 so that the brake pressure to the wheels increases.

Then, an electric power is applied to solenoid 540 to generate magnetic power. At the same time, armature 530 moves upwards by the magnetic power of solenoid 540 while overcoming the bias force of third spring 576.

When armature 530 moves upwards, plunger 532 securely inserted in armature 530 also moves upwards while pushing first spring 556 upwards. Therefore, as shown in FIG. 4B, pressure fluid inlet 552 is closed by first ball 554.

From this state, the pressure fluid does not flow into solenoid valve 500 so that solenoid valve 500 maintains the pressure maintaining mode, wherein the constant brake pressure is applied to the wheels.

On the other hand, when the electric power is continuously applied to solenoid 540, as shown in FIG. 4C, armature 530 moves upwards to the underside of bush 542 inserted in the upper end portion of second chamber 518 of valve body 510. Second ball 562 rested in lower valve seat 560 is simultaneously pushed by a neck portion 536 of plunger 532 so that second ball 563 moves upwards. At this time, the pressure fluid leaks through a fine gap formed between pressure fluid outlet 564 of lower valve seat 560 and plunger 532 and then, the leaked pressure fluid is exhausted to a fluid tank (not shown) through second port 514. From this state solenoid valve 500 maintains the pressure reducing mode wherein the brake pressure applied to the wheels of the vehicle reduces.

The conventional solenoid valve rapidly repeats the pressure increasing mode, the pressure maintaining mode and the pressure reducing mode in a short time period so that the locking of wheels can be prevented when the driver puts on the brake suddenly.

However, since the conventional solenoid valve requires various elements, the construction of the conventional solenoid valve may be complicated. Therefore, controlling the conventional solenoid valve is difficult. Moreover, the cost for manufacturing the conventional solenoid valve increases.

Further, the first, second and third springs must be manufactured accurately for performing the pressure increasing mode, the pressure maintaining mode and the pressure reducing mode of the solenoid valve precisely. Thus, manufacturing the solenoid valve is difficult.

SUMMARY OF THE INVENTION

The present invention has been made to overcome the above described problems of the prior arts, and accordingly it is an object of the present invention to provide a brake pressure control apparatus for automobiles with an anti-lock braking system, which can be easily operated with the simple construction and manufactured with reduced cost.

To achieve the above object, the present invention provides a brake pressure control apparatus for an anti-lock braking system in automobiles, the apparatus comprising:

a housing connected to a hydraulic pump so as to introduce pressure fluid from the hydraulic pump to the brake pressure control apparatus:

a step motor mounted on the upper surface of the housing for generating a rotational force according to an operating signal from an electrical control unit, the step motor having a motor shaft formed integrally with a spline shaft at its end;

a bushing securely inserted in the housing for guiding the pressure fluid which has been introduced through housing into the brake pressure control apparatus; and a rotary valve rotatably accommodated in the bushing for receiving pressure fluid from the bushing and then for transferring the pressure fluid to a wheel cylinder or a fluid tank alternately, the rotary valve being rotated by the step motor.

According to a preferred embodiment of the present invention, the housing has a first fluid path connected to the hydraulic pump so as to introduce the pressure fluid to the bushing and a second fluid path connected to the wheel cylinder so as to introduce the pressure fluid which has passed through the bushing into the wheel cylinder.

In addition, the bushing has a substantially hollow cylindrical shape and a portion of its outer wall is shaped as a plane portion so as to easily return the pressure fluid to the fluid tank. Also, the bushing has a first cutting portion and a second cutting portion at its outer wall. The first cutting portion is located so as to correspond to the first fluid path of the housing in such a manner that the pressure fluid can easily flow from the first fluid path of the housing into the bushing and the second cutting portion is located so as to correspond to the second fluid path of the housing in such a manner that the pressure fluid that has passed through the bushing can easily flow into the second fluid path of the housing. The first and the second cutting portions have a rectangular groove shape and are disposed at a same longitudinal level. In addition, the second cutting portion is spaced clockwise at an angle of 120 degrees apart from the first cutting portion and the plane portion of the bushing is spaced counter-clockwise at an angle of 120 degrees apart from the first cutting portion. Further, the first cutting portion is provided at a bottom of the first cutting portion with an inlet hole for receiving the pressure fluid from the housing, the second cutting portion is provided at a bottom of the second cutting portion with an outlet hole for guiding pressure fluid applied to the wheel cylinder and the plane portion is provided at a bottom of the plane portion with a perforation hole for communicating with fluid tank. The perforation hole is longitudinally upward spaced at a predetermined length apart from the inlet and outlet holes.

Furthermore, the rotary valve has a first port, a second port, a third port, a first elongated groove extended downwards from a first end of the second port, a second elongated groove extended downwards from a second end of the second port, a third elongated groove extended upwards from a first end of the third port and a fourth elongated groove extended upwards from a second end of the third port. Each of the first port, the second port and the third port is alternately communicated with the inlet hole, the outlet hole and the perforation hole of the bushing as the rotary valve rotates. In addition, the rotary valve is provided at its outer wall with oil grooves for reducing a friction between an outer wall of the rotary valve and an inner wall of bushing when the rotary valve rotates. Also, the rotary valve further has a splined groove formed at the center of an upper surface of the rotary valve and the spline shaft of the step motor is inserted in the groove so that the rotary valve may rotates as the spline shaft rotates. The first and the second ports of the rotary valve are respectively located so as to correspond to the inlet hole and the outlet hole of the bushing and the third port of the rotary valve is located so as to correspond to the perforation hole of the bushing. In the meantime, the first port and the second port are interconnected with each other at a same plane. Further, the second port is positioned clockwise at an angle of 120 degrees apart from the first port and the third port is positioned clockwise at an angle of 120 degrees apart from the second port, as seen in plan view. The first and second elongated grooves have the same size as the third and fourth elongated grooves, respectively and each of the first, the second, the third and the fourth elongated grooves is alternately and continuously communicated with the inlet, the outlet and the perforation holes of the bushing as the rotary valve rotates.

The brake pressure control apparatus having the above features is operated as follows.

In the pressure increasing mode, the pressure fluid is introduced into the first port of the rotary valve from the hydraulic pump through the first cutting portion and the inlet hole of the bushing. Then, the pressure fluid that has been introduced into the first port of the rotary valve flows to the second fluid path of the housing. Thereafter, the pressure fluid that has flowed into the second fluid path of the housing is introduced to the wheel cylinder connected to the wheels of vehicle so that the brake pressure applied to the wheels of the vehicle increases.

Then, the rotary valve is rotated clockwise at an angle of 60 degrees by the step motor. From this state, the pressure maintaining mode may start.

In the pressure maintaining mode, the pressure fluid which has flowed into the second port of the rotary valve from the hydraulic pump remains in the first and the second ports of the rotary valve so that the pressure fluid may not be introduced into the wheel cylinder. In addition, since one end of the third port of the rotary valve is closed by the inner wall of the bushing, the pressure fluid that has been introduced into the wheel cylinder dose not flow backwards, that is, to the hydraulic pump or the fluid tank so that the brake pressure applied to the wheels maintains constant.

Thereafter, the rotary valve is further rotated clockwise at an angle of 60 degrees by the step motor and the pressure reducing mode starts.

In the pressure reducing mode, since one end of the third port of the rotary valve is closed by the inner wall of the bushing, the pressure fluid which has flowed from the hydraulic pump remains in the third port of the rotary valve so that the pressure fluid may not be introduced into the wheel cylinder.

However, since the second port communicates with the perforation hole of the bushing, the pressure fluid that has been introduced into the wheel cylinder may return to the fluid tank through the perforation hole of the bushing.

Since the second port communicates with the wheel cylinder, the pressure fluid that has been introduced into the wheel cylinder is also returned to the fluid tank and thereby the brake pressure applied to the wheels is reduced.

The brake pressure control apparatus of the present invention rapidly repeats the pressure increasing mode, the pressure maintaining mode and the pressure reducing mode in a short time period, so that the locking of the wheels can be prevented when the driver puts on brake suddenly.

As described above, the brake pressure control apparatus for anti-lock braking system in automobiles according to the present invention has a simple construction and can be easily manufactured. Further, the brake pressure control apparatus of the present invention has a compact size so that it can be easily applied to an ABS.

Furthermore, the brake pressure control apparatus of the present invention requires only a few elements so that the cost for manufacturing the brake pressure control apparatus can be reduced.

BRIEF DESCRIPTION OF THE DRAWINGS

The above objects and other advantages of the present invention will become more apparent by describing in detail preferred embodiments thereof with reference to the attached drawings, in which:

FIG. 1 is a schematic view of a brake pressure control apparatus for automobiles with an anti-lock braking system according to one embodiment of the present invention;

FIGS. 2A 2B and 2C are partial sectional views of the rotary valve shown in FIG. 1;

FIGS. 3A 3B, 3C, 3D, 3E and 3F are sectional views showing the pressure increasing mode, the pressure maintaining mode and the pressure reducing mode of the brake pressure control apparatus according to one embodiment of the present invention;

FIG. 3G is a schematic view showing the flow of pressure fluid;

DESCRIPTION OF THE PREFERRED EMBODIMENTS

Figure 4A:
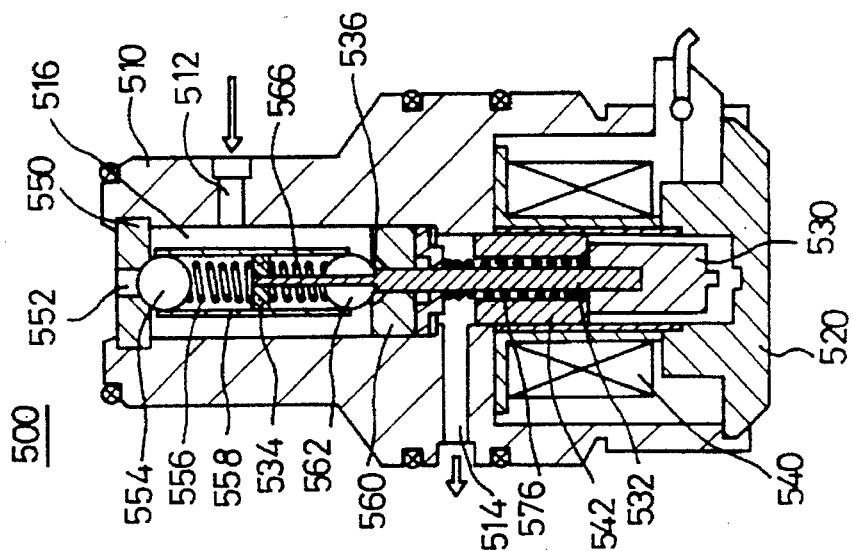
FIGS. 4A to 4C are sectional views for showing the pressure increasing mode, the pressure maintaining mode and the pressure reducing mode of a conventional solenoid valve used in ABS, respectively.
Figure 4B:
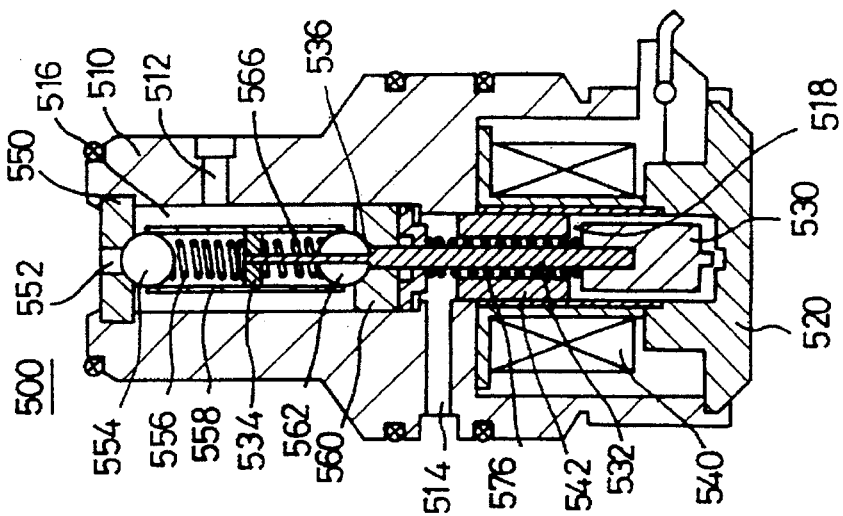
Figure 4C:
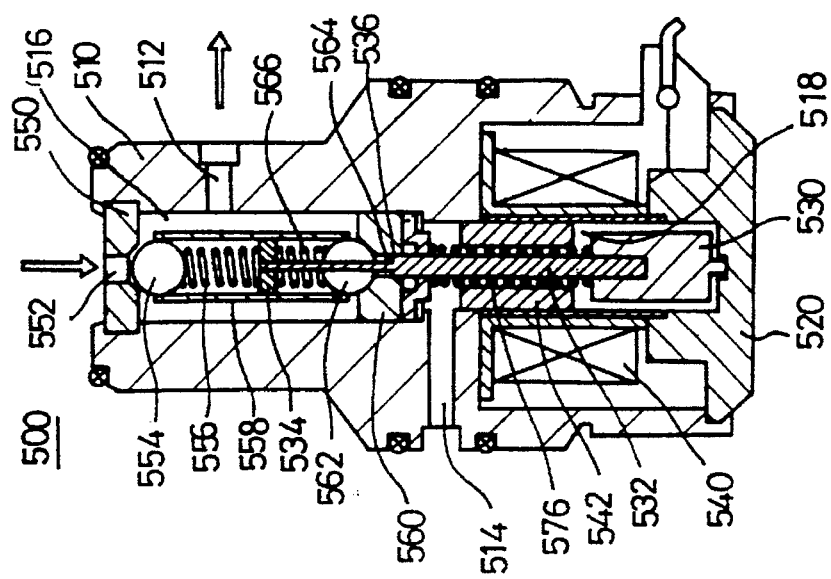

Hereinafter, the present invention will be described in detail with reference to the accompanying drawings.

FIG. 1 shows a brake pressure control apparatus 100 for an anti-lock braking system in automobiles according to one embodiment of the present invention.

As shown in FIG. 1, brake pressure control apparatus 100 has a housing 110 connected to a hydraulic pump P so as to guide pressure fluid from hydraulic pump P to brake pressure control apparatus 100. A step motor 120 is mounted on an upper surface of housing 110 so as to generate a rotational force according to operating signal from an electrical control unit (ECU). A bushing 130 is securely inserted in housing 110 so as to guide the pressure fluid which has flowed through housing 110 into brake pressure control apparatus 100. Further, a rotary valve 140 is rotatably accommodated in bushing 130 for receiving the pressure fluid from bushing 130 and is rotated by step motor 120 so as to transfer the pressure fluid which has flowed through bushing 130 to a wheel cylinder B or fluid tank T, alternately.

Housing 110 has a first fluid path 112 connected to hydraulic pump P so as to guide the pressure fluid to bushing 130 and a second fluid path 114 connected to wheel cylinder B so as to guide the pressure fluid which has passed through bushing 130, to wheel cylinder B.

Step motor 120 has a motor shaft 122 formed integrally with a spline shaft 124 at an end thereof. Spline shaft 124 is inserted in a splined groove 144 formed at the center of the upper surface of rotary valve 140 so that rotary valve 140 may rotate as motor shaft 122 of step motor 120 rotates.

Bushing 130 has a substantially hollow cylindrical shape and some portion of its outer wall (i.e., the portion adjacent to fluid tank T) is shaped as a plane portion 132 so as to easily return the pressure fluid to fluid tank T. In addition, rotary valve 140 has oil grooves 142 at its outer wall. During the operation of the ABS, some of the brake oil leaks into oil grooves 142 so that the friction between the outer wall of rotary valve 140 and the inner wall of bushing 130 can be reduced when rotary valve 140 is rotated by step motor 120.

As shown in FIGS. 2A to 2D, bushing 130 has first and second cutting portions 133 and 135 at its cylindrical outer wall for easily introducing or discharging the pressure fluid. First cutting portion 133 is located so as to correspond to first fluid path 112 of housing 110 in such a manner that the pressure fluid can easily flow from first fluid path 112 of housing 110 into bushing 130. Second cutting portion 135 is located so as to correspond to second fluid path 114 of housing 110 in such a manner that the pressure fluid that has passed through bushing 130 can easily flow into second fluid path 114 of housing 110. Both first and second cutting portions 133 and 135 have a rectangular groove shape, and can be made by a machine work, such as a lathe work.

First and second cutting portions 133 and 135 are positioned at the same longitudinal level. However, second cutting portion 135 is spaced clockwise at an angle of 120 degrees apart from first cutting portion 133. On the other hand, plane portion 132 of bushing 130 is spaced counter-clockwise at an angle of 120 degrees apart from first cutting portion 133.

At the bottom of first cutting portion 133 of bushing 130, an inlet hole 134 is formed for guiding pressure fluid to rotary valve 140. An outlet hole 136 for guiding pressure fluid to wheel cylinder B is formed at the bottom of second cutting portion 135 of bushing 130. In addition, plane portion 132 of bushing 130 has a perforation hole 138 which connects rotary valve 140 to fluid tank T. Perforation hole 138 of bushing 130 is longitudinally spaced at a predetermined length from inlet and outlet holes 134 and 136 of bushing 130.

On the other hand, rotary valve 140 has first, second, and third ports 144, 145 and 146. As rotary valve 140 rotates, first, second and third ports 144, 145 and 146 of rotary valve 140 are alternately communicated with inlet, outlet and perforation holes 134, 136 and 138 of bushing 130 in such a manner that the pressure fluid which has flowed through bushing 130 can be transferred to wheel cylinder B or can be returned to fluid tank T.

First, second and third ports 144, 145 and 146 are extended so as to pass through rotary valve 140. First and second ports 144 and 145 of rotary valve 140 are respectively located so as to correspond to inlet and outlet holes 134 and 136 of bushing 130 and third port 146 of rotary valve 140 is located so as to correspond to perforation hole 138 of bushing 130. Accordingly, first and second ports 144 and 145 of rotary valve 140 are communicated with each other at the same plane and third port 146 of rotary valve 140 is longitudinally spaced at a predetermined length from first and second ports 144 and 145.

Therefore, second port 145 is positioned clockwise at an angle of 120 degrees apart from first port 144 and third port 146 is positioned clockwise at an angle of 120 degrees apart from second port 145, although third port 146 has a different longitudinal level with respect to first and second ports 144 and 145.

Accordingly, rotary valve 140 is divided into six planes by first, second and third ports 144, 145 and 146, as seen in plan view.

In addition, rotary valve 140 has a first elongated groove 143 extended downwards from one end of second port 145, a second elongated groove 143A extended downwards from the other end of second port 145, a third elongated groove 147 extended upwards from one end of third port 146 and a fourth elongated groove 147A extended upwards from the other end of third port 146.

First and second elongated grooves 143 and 143A have the same size as third and fourth elongated grooves 147 and 147A. As rotary valve 140 rotates, first, second, third and fourth elongated grooves 143, 143A, 147 and 147A are alternately and continuously communicated with inlet, outlet and perforation holes 134, 136 and 138 of bushing 130 so that the pressure increasing mode, the pressure maintaining mode and the pressure reducing mode may be continuously performed.

The operation of brake pressure control apparatus 100 having the above structure is shown in FIGS. 3A–3G. As shown in the figures, brake pressure control apparatus 100 according to this embodiment of the present invention also has the pressure increasing mode wherein the brake pressure applied to the wheels increases, the pressure maintaining mode wherein the brake pressure applied to the wheels maintains constant and the pressure reducing mode wherein the brake pressure applied to the wheels reduces.

However, in the brake pressure control apparatus of the present embodiment, the pressure increasing mode, the pressure maintaining mode and the pressure reducing mode in relation to the wheels of the vehicle are attained by operating rotary valve 140 without using the solenoid valve.

Hereinafter, the operation of brake pressure control apparatus 100 of the present embodiment will be described with reference to FIGS. 3A to 3G.

Firstly, when a driver puts on the brake suddenly, the speed of the vehicle decreases suddenly. At this time, a speed sensor (not shown) attached to the wheels of the vehicle senses the decreased speed and then sends an operating signal to the ECU. Then, the ECU operates the ABS according to a predetermined algorithm. That is, the ECU applies an operating signal to step motor 120 and a pump motor (not shown) simultaneously so that the pressure increasing mode may start.

In the pressure increasing mode, one end of first port 144 of rotary valve 140 communicates with inlet hole 134 of bushing 130 and one end of second port 145 of rotary valve 140 communicates with outlet hole 136 of bushing 130.

In this state, the pressure fluid is introduced into first port 144 of rotary valve 140 from hydraulic pump P through first fluid path 112 of housing 110, first cutting portion 133 and inlet hole 134 of bushing 130. Then, since both the other end of first port 144 and the other end of second port 145 are closed by the inner wall of bushing 130, the pressure fluid that has been introduced into first port 144 of rotary valve 140 flows into second fluid path 114 connected to wheel cylinder B, through second port 145 of rotary valve 140, outlet hole 136 and second cutting portion 135 of bushing 130. Thereafter, the pressure fluid that has flowed into second fluid path 114 of housing 110 is introduced into wheel cylinder B connected to the wheels of the vehicle so that brake pressure applied to the wheels of the vehicle increases.

On the other hand, although third port 146 of rotary valve 140 communicates with fluid tank P, the pressure fluid does not return to fluid tank T because the pressure fluid can not flow into third port 146 of rotary valve 140.

Then, rotary valve 140 is rotated clockwise at an angle of 60 degree by step motor 120. From this state, the pressure maintaining mode starts.

In the pressure maintaining mode, one end of second port 145 of rotary valve 140 communicates with inlet hole 134 of bushing 130 and one end of third port 146 of rotary valve 140 communicates with outlet hole 136 of bushing 130 through fourth elongated groove 147A.

However, since the other end of second port 145 and both ends of first port 144 are closed by the inner wall of bushing 130, the pressure fluid which has flowed into second port 145 of rotary valve 140 from hydraulic pump P remains in first and second ports 144 and 145 of rotary valve 140. That is, the pressure fluid is not introduced into wheel cylinder B. In addition, since the other end of third port 146 of rotary valve 140 is closed by the inner wall of bushing 130, the pressure fluid that has been introduced into wheel cylinder B dose not flow backwards so that the brake pressure applied to the wheels maintains constant.

On the other hand, since first port 144 of rotary valve 140 is located below perforation hole 138 of bushing 130, first port 144 of rotary valve 140 can not communicate with perforation hole 138 of bushing 130 so that the pressure fluid does not return to fluid tank T.

Thereafter, rotary valve 140 is further rotated clockwise at an angle of 60 degrees by step motor 120 and the pressure reducing mode starts.

In the pressure reducing mode, one end of third port 146 of rotary valve 140 communicates with inlet hole 134 of bushing 130 through elongated groove 147 and one end of first port 144 of rotary valve 140 communicates with outlet hole 136 of bushing 130. In addition, one end of second port 145 of rotary valve 140 communicates through first elongated groove 143 with perforation hole 138 connected to fluid tank T.

In this state, since the other end of third port 146 is closed by the inner wall of bushing 130, the pressure fluid which has flowed into third port 146 of rotary valve 140 from hydraulic pump P remains in third port of rotary valve 140 so that the pressure fluid is not introduced into wheel cylinder B.

However, as mentioned above, second port 145 communicated with perforation hole 138 of bushing 130 is also communicated with wheel cylinder B through first port 144 of rotary valve 140 so that the pressure fluid that has been introduced into wheel cylinder B may return to fluid tank T through second cutting portion 135 of bushing 130, second port 145 of rotary valve 140, first elongated groove 143 and perforation hole 138 of bushing 130, due to the pressure difference between second port 145 of rotary valve 140 and fluid tank T. Thus, the brake pressure applied to the wheels is reduced.

On the other hand, as described above, since bushing 130 has plane portion 132 in the vicinity of fluid tank T, the pressure fluid may easily return to fluid tank T.

Furthermore, in the course of each mode, third port 146 of rotary valve 140, which is longitudinally spaced at a predetermined length apart from first and second ports 144 and 145, is also alternately communicated with inlet, outlet and perforation holes 134, 136 and 138 of bushing 130 so that the pulsation of rotary valve 140 caused by the deviation of the pressure fluid can be reduced.

Brake pressure control apparatus 100 of the present invention rapidly repeats the pressure increasing mode, the pressure maintaining mode and the pressure reducing mode in a short time period so that the locking of the wheels can be prevented when the driver puts on the brake suddenly.

In the meantime, though rotary valve 140 is illustrated as it rotates clockwise, the rotary valve can be rotated counterclockwise by using a reversible motor. In this case, the same braking effect can be realized.

As described above, the brake pressure control apparatus for anti-lock braking system in vehicles according to the present invention has a simple construction and can be easily manufactured.

Further, the brake pressure control apparatus of the present invention has a compact size so that it can be easily applied to an ABS.

Furthermore, the brake pressure control apparatus of the present invention does not require many elements so that the cost for manufacturing the brake pressure control apparatus can be reduced.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A brake pressure control apparatus for controlling a brake pressure in an automobile which has a hydraulic pump, a wheel cylinder, and a fluid tank, the apparatus comprising:

a housing connected to the hydraulic pump so as to receive a pressurized fluid from the hydraulic pump, the housing having a first fluid path connected to the hydraulic pump so as to receive the pressurized fluid, and a second fluid path connected to the wheel cylinder so as to introduce the pressurized fluid into the wheel cylinder;

a first means for generating a rotational force according to an operating signal from an electrical control unit, the first means being mounted on an upper surface of the housing;

a second means for guiding the pressurized fluid which has flowed through the housing, the second means being securely inserted in the housing, the second means including a bushing which has a substantially hollow cylindrical shape, the bushing being formed at its outer wall with a planar portion so as to return the pressure fluid to the fluid tank, the bushing having a first cutting portion and a second cutting portion at its outer wall, the first cutting portion being located so as to correspond to the first fluid path of the housing in such a manner that the pressure fluid flows from the first fluid path of the housing into the bushings, and the second cutting portion being located so as to correspond to the second fluid path of the housing in such manner that the pressurized fluid that has passed through the bushing flows into the second fluid path of the housing, the first cutting portion having an inlet hole for receiving the pressure fluid from the housing at a bottom of the first cutting portion, the second cutting, portion having an outlet hole for guiding the pressure to the wheel cylinder at a bottom of the second cutting portion, and the planar portion having a perforation hole for communicating with the fluid tank at a bottom of the planar portion, the perforation hole being longitudinally upwardly spaced by a predetermined length from the inlet and outlet holes; and a third means for receiving the pressure fluid from the second means, and then for transferring the pressure fluid to the wheel cylinder or the fluid tank alternately, the third means being rotatably accommodated in the second means and rotated by the first means.

2. The apparatus as claimed in claim 1, wherein the first means includes a step motor having a motor shaft.

3. The apparatus as claimed in claim 2, wherein the motor shaft of the step motor is formed integrally with a spline shaft at its end.

4. The apparatus as claimed in claim 3, wherein the first and the second cutting portions have a rectangular groove shape and are disposed at a same longitudinal level.

5. The apparatus as claimed in claim 3, wherein the second cutting portion is spaced clockwise at an angle of 120 degrees apart from the first cutting portion.

6. The apparatus as claimed in claim 3, wherein the plane portion of the bushing is spaced counter-clockwise at an angle of 120 degrees apart from the first cutting portion.

7. The apparatus as claimed in claim 3, wherein the third means includes a rotary valve having a first port, a second port, a third port, a first elongated groove extended downwards from a first end of the second port, a second elongated groove extended downwards from a second end of the second port, a third elongated groove extended upwards from a first end of the third port and a fourth elongated groove extended upwards from a second end of the third port, each of the first port, the second port and the third port being alternately communicated with the inlet hole, the outlet hole and the perforation hole as the rotary valve rotates.

8. The apparatus as claimed in claim 7, wherein the rotary valve is provided at its outer wall with oil grooves for reducing a friction between an outer wall of the rotary valve and an inner wall of bushing when the rotary valve rotates.

9. The apparatus as claimed in claim 7, wherein the rotary valve further has a splined groove formed at a center of an upper surface of the rotary valve, the spline shaft of the step motor being inserted in the groove so that the rotary valve may rotates as the spline shaft rotates.

10. The apparatus as claimed in claim 9, wherein the rotary valve repeatedly rotates at an angle of 60 degrees.

11. The apparatus as claimed in claim 7, wherein the first and second ports of the rotary valve are located so as to correspond to the inlet hole and the outlet hole of the bushing, and the third port of the rotary valve is located so as to correspond to the perforation hole of the bushing, the first and second ports being interconnected with each other at a same plane.

12. The apparatus as claimed in claim 7, wherein the second port is positioned clockwise at an angle of 120 degrees apart from the first port and the third port is positioned clockwise at an angle of 120 degrees apart from the second port in a plan view.

13. The apparatus as claimed in claim 7, wherein the first and second elongated grooves have the same size as the third and fourth elongated grooves, each of the first, the second, the third and the fourth elongated grooves being alternately and continuously communicated with the inlet, the outlet and the perforation holes of the bushing as the rotary valve rotates.

14. A brake pressure control apparatus for controlling a brake pressure in an automobile which has a hydraulic pump, a wheel cylinder, a fluid tank, the apparatus comprising:

a housing for receiving a pressure fluid from the hydraulic pump, the housing having a first fluid path connected to the hydraulic pump for guiding the pressure fluid and a second fluid path connected to the wheel cylinder for introducing the pressure fluid into the wheel cylinder;

a step motor for generating a rotational force according to an operating signal from a electrical control unit, the step motor having a motor shaft formed integrally with a spline shaft at its end, the step motor being mounted on an upper surface of the housing;

a bushing securely inserted in the housing for guiding the pressure fluid which has flowed through the housing, the bushing having a substantially hollow cylindrical shape and being formed at its outer wall with a planar portion so as to return the pressure fluid to the fluid tank, the bushing having a first cutting portion and a second cutting portion at its outer wall, the first cutting portion being located so as to correspond to the first fluid path of the housing in such a manner that the pressure fluid flows from he first fluid path of the housing into the bushing and the second cutting portion being located so as to correspond to the second fluid path of the housing in such a manner that the pressure fluid that has passed through the bushing flows into the second fluid path of the hosing, the first and second cutting portions having a rectangular groove shape and being disposed at a same longitudinal level, the second cutting portion being spaced clockwise at an angle of 120 degrees apart from the first cutting portion, the planar portion of the bushing being spaced counter-clockwise at an angle of 120 degrees apart from the first cutting portion, the first cutting portion having an inlet hole for receiving the pressure fluid from the housing at the bottom of the first cutting portion, the second cutting portion having an outlet hole for guiding the pressure fluid to the wheel cylinder at a bottom of the second cutting portion, the plane portion having a perforation hole for communicating with the fluid tank at a bottom of the plane portion, the perforation hole being longitudinally upward spaced at a predetermined length apart from the inlet and outlet holes; and a rotary valve rotatably accommodated in the bushing for receiving the pressurized fluid from the bushing and then for transferring the pressurized fluid to the wheel cylinder or the fluid tank alternately, the rotary valve having a first port, a second port, a third port, a first elongated groove extended downwards from a first end of the second port, a second elongated groove extended downwards from a second end of the second port, a third elongated groove extended upwards from a first end of the third port and a fourth elongated groove extended upwards from a second end of the third port, each of the first port, the second port and the third port being alternately communicated with the inlet hole, the outlet hole and the perforation hole of the bushing as the rotary valve rotates, the rotary valve being provided at its outer wall with oil grooves for reducing a friction between the outer wall of the rotary valve and an inner wall of bushing when the rotary valve rotates, the rotary valve further having a splined groove formed at a center of an upper surface of the rotary valve, the spline shaft of the step motor being inserted in the splined groove so that the rotary valve rotates as the splined shaft rotates, the rotary valve being repeatedly rotated at an angle of 60 degrees, the first and second ports of the rotary valve being located so as to correspond to the inlet hole and the outlet hole of the bushing, and the third port of the rotary valve being located so as to correspond to the perforation hole of the bushing, the first port and the second port being interconnected with each other at a same plane, the second port being positioned clockwise at an angle of 120 degrees apart from the first port and the third port being positioned clockwise at an angle of 120 degrees apart from the second port in a plan view, the first and second elongated grooves having a same size as the third and fourth elongated grooves, each of the first, second, third and fourth elongated grooves being alternately and continuously communicated with the inlet, outlet and perforation holes of the bushing as the rotary valve rotates.

* * * * *